D. W. BROWN.
PNEUMATIC MAT.
APPLICATION FILED MAR. 1, 1915.
1,296,359.
Patented Mar. 4, 1919.
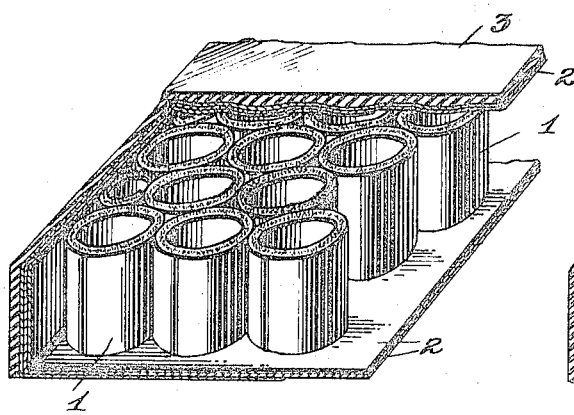
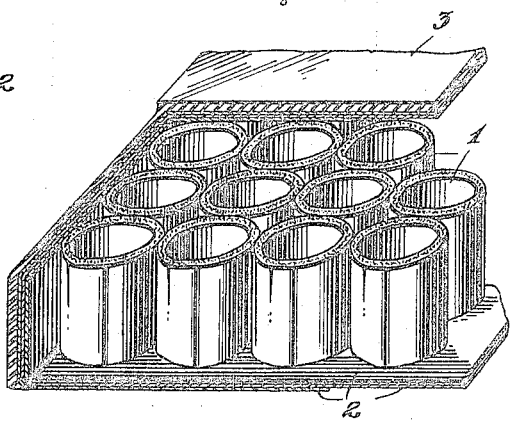
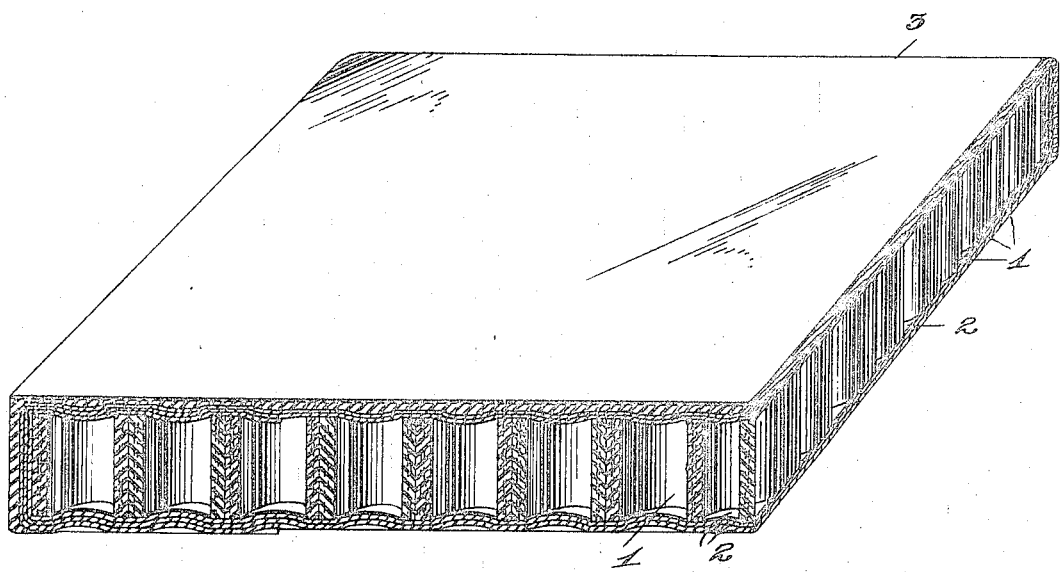
Witnesses:
Ernest C. Crocker
Earl C. Carlson
Inventor:
Daniel Webster Brown
By Harry Frease
Attorney

UNITED STATES PATENT OFFICE.

DANIEL WEBSTER BROWN, OF YOUNGSTOWN, OHIO.

PNEUMATIC MAT.

1,296,359. Specification of Letters Patent. Patented Mar. 4, 1919.

Application filed March 1, 1915. Serial No. 11,439.

*To all whom it may concern:*

Be it known that I, DANIEL WEBSTER BROWN, a citizen of the United States, residing in Youngstown, in the county of Mahoning and State of Ohio, have invented certain new and useful Improvements in Pneumatic Mats, of which the following is a specification.

The invention relates to cushion mats for use in bowling alley pits or other like places, for receiving and withstanding the impact of balls, pins and other heavy articles; and the object of the invention is to provide a mat in which the body or filler portion will remain intact, and in proper position for receiving and cushioning the impact of the impinging articles.

This object is attained by making the body or filler portion of the mat out of resilient tubing made of rubber or rubber with inserted fabric, the tubing being located in laterally abutting rows or series; and by inclosing or wrapping the rows or series of tubing in a cover of rubber or fabric, or rubber and fabric; the several parts of the mat being compressed and secured together as by means of rubber cement and a vulcanizing or curing process.

The invention thus set forth in general terms, may be embodied in a mat having its body portion made of a series of sections of tubing uprightly located side by side, as illustrated in the accompanying drawings, forming part hereof, in which—

Figure 1 is a fragmentary perspective view of a portion of the completed mat, showing the arrangement of the parts;

Fig. 2, a fragmentary perspective view, with part of the cover broken away, showing a staggered arrangement of the upright tubing; and Fig. 3, a similar view showing the upright tubing arranged in rectangular rows.

Similar numerals refer to similar parts throughout the drawings.

In the form of invention illustrated and described herein, the tubular body portion of the mat is made of a series of short upright sections of tubes 1 located side by side throughout the extent of the mat. These tubular sections may be cut from ordinary hose, and the walls thereof may be composed entirely of rubber, or of rubber reinforced with cloth, fabric, or other insertion.

The tubular sections forming the body of the mat are then inclosed by wrapping around them one or more layers to form a cover on all sides and edges of the mat. This cover may be made by wrapping one of its layers in one direction and another layer in the opposite direction, and by staggering the joints so that the tubular body portion will be completely inclosed by an air-tight envelop; and the layers of the cover may be composed of cloth or other fabric 2, which may be impregnated with rubber, or one or all of the layers 3 may be made entirely of rubber, depending upon the use and wear to which the mat is to be subjected.

The contacting portions of the cover layer, and of the tubular sections with each other and with the adjoining portions of the cover layers, are preferably coated with a rubber cement; and the mat thus formed is compressed in all directions and cured by a process, which flattens, to some extent, the sides of the adjoining walls and makes a compact structure throughout, as shown in Fig. 1.

It is evident that the abutting upright walls of the tubular body portion strengthen or stiffen the same against vertical strains; and that the contained air serves as a pneumatic cushion, the strength of which may be increased by increasing the pressure of the contained air as may be desired.

I claim:

1. A mat including a body made of resilient tubing having squarely-cut ends and arranged uprightly in laterally abutting series.

2. A mat including a body made of laterally abutting upright sections of resilient tubing having squarely-cut ends.

3. A pneumatic mat including a body made of resilient tubing having squarely-cut ends and arranged uprightly in laterally abutting series, and an air-tight cover inclosing the body.

4. A mat including a body made of uprightly located laterally abutting sections of resilient tubing having squarely-cut ends, and a cover inclosing the body.

5. A mat including a body made of resilient tubing having squarely-cut ends and arranged uprightly in laterally abutting series and a cover inclosing a body, the body and cover being compressed to flatten the sides of the tubing and secured together by rubber cement and a vulcanizing process.

DANIEL WEBSTER BROWN.

Witnesses:
E. E. WRIGHT,
G. F. HODGSON.